(No Model.) 3 Sheets—Sheet 1.
E. P. M. ROBINSON.
SEEDER OR GRAIN PLANTER.
No. 375,198. Patented Dec. 20, 1887.
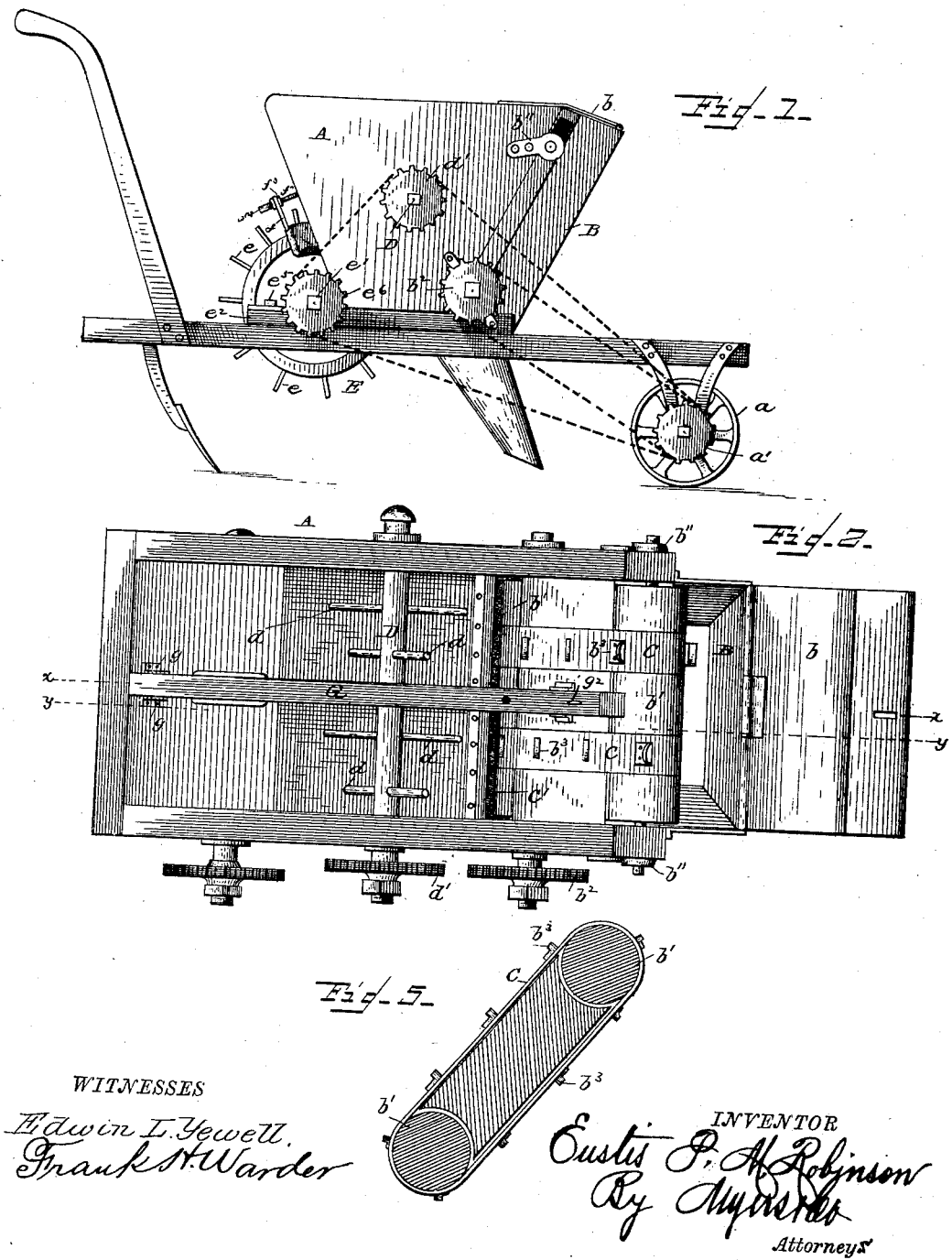
WITNESSES
Edwin L. Yewell.
Frank H. Warder
INVENTOR
Eustis P. M. Robinson
By
Attorneys

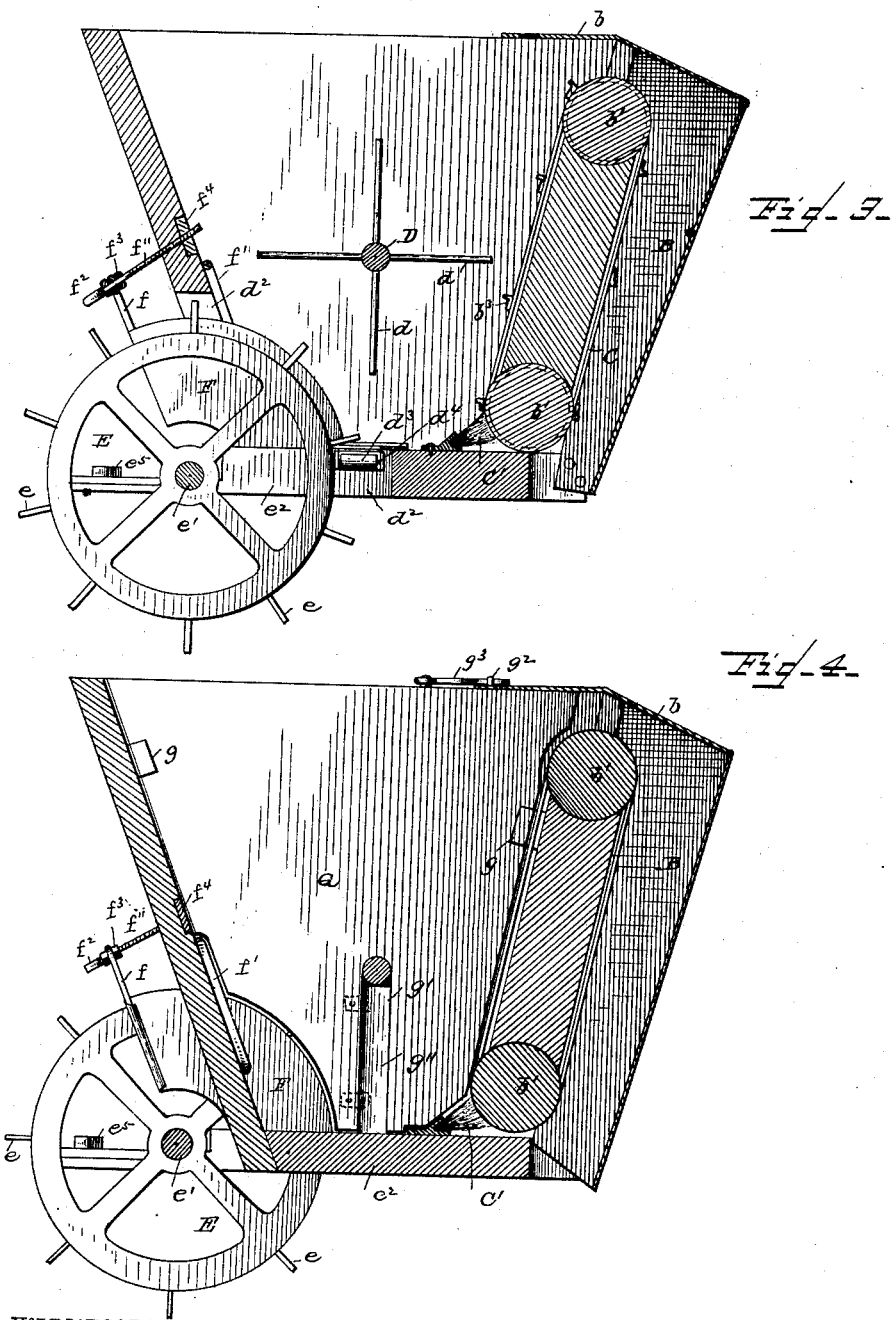

(No Model.) 3 Sheets—Sheet 3.
E. P. M. ROBINSON.
SEEDER OR GRAIN PLANTER.
No. 375,198. Patented Dec. 20, 1887.
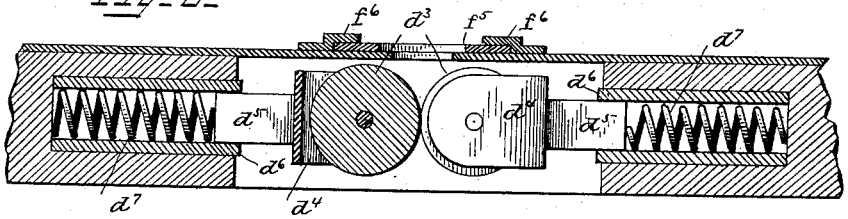
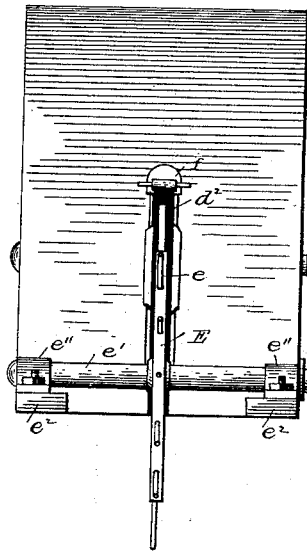
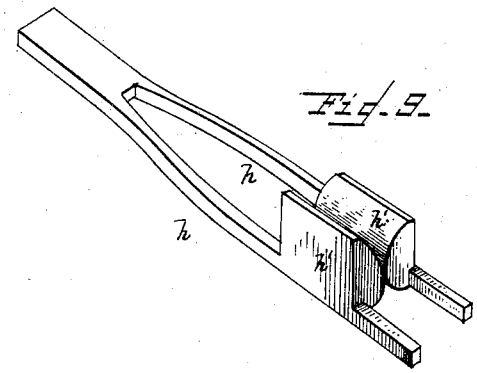
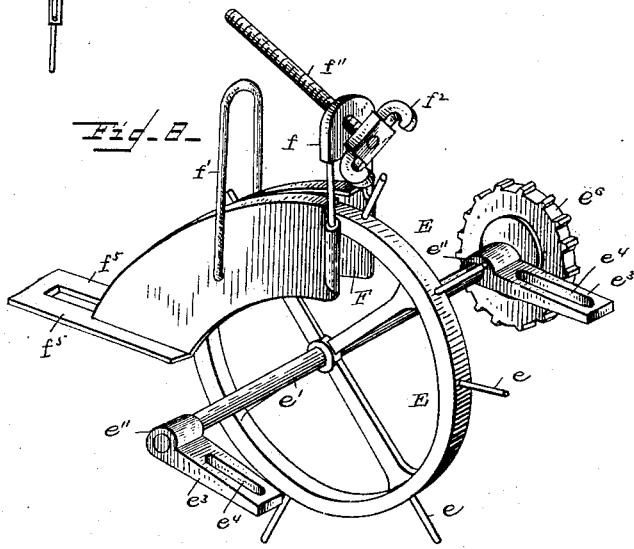
WITNESSES
Edwin L. Yewell,
Frank H. Warder
INVENTOR
Eustis P. M. Robinson
By Myers & Co.
Attorneys.

UNITED STATES PATENT OFFICE.

EUSTIS P. M. ROBINSON, OF ROUND ROCK, TEXAS.

SEEDER OR GRAIN-PLANTER.

SPECIFICATION forming part of Letters Patent No. 375,198, dated December 20, 1887.

Application filed August 13, 1887. Serial No. 246,823. (No model.)

*To all whom it may concern:*

Be it known that I, EUSTIS P. M. ROBINSON, a citizen of the United States of America, residing at Round Rock, in the county of Williamson and State of Texas, have invented certain new and useful Improvements in Seeders or Grain-Planters, of which the following is a specification, reference being had therein to the accompanying drawings.

This invention pertains to certain new and useful improvements in seeders or grain-planters, having reference more particularly to that class of inventions capable of planting corn, peas, wheat, oats, and cotton.

The invention further consists in providing means for simultaneously planting two separate rows of the same or different grain, the same being fed from one hopper, and new and improved means for regulating the amount of cotton-seed to be fed from the hopper; and to these ends the invention consists in the detailed construction, combination, and arrangement of the parts, substantially as hereinafter fully set forth, and particularly pointed out in the claims.

In the accompanying drawings, Figure 1 is a view in side elevation of my invention. Fig. 2 is a plan view thereof. Figs. 3 and 4 are longitudinal sectional views on the lines $x\ x$ and $y\ y$, respectively, Fig. 2. Figs. 5 and 6 are enlarged detail sectional views. Fig. 7 is a rear end view. Fig. 8 is an enlarged detail perspective view of the cotton-distributing wheel and its parts, and Fig. 9 is a view of a modification of my invention.

Referring to the drawings, A represents the grain or seed hopper mounted on the upper rear end of the normally-horizontal portion of any ordinary cultivator-frame, the invention being applicable to any preferred form of cultivator in general use. Such cultivator must, however, have a front supporting-wheel, as $a$, on the axle of which is secured a small sprocket-wheel, $a'$, as shown.

The hopper A has secured to its front inclined surface a chute or open-ended chamber or passage-way, B, the same extending a short distance below the bottom of said hopper, as shown. This chute or chamber has a lid or cover, $b$, hinged to its upper edge, the same being designed to be closed down over the upper end of said chute or chamber.

In the upper and lower ends of the front inclined wall of the hopper A are secured two horizontal rollers, $b'\ b'$, the axles of which project through apertures or slots formed in the sides of said hopper and secured by eye plates or irons $b''$, attached to the sides of the hopper. On the projecting end of the axle of the lower roller $b'$ is rigidly secured a small sprocket-wheel, $b^2$. These rollers are caused to fit within corresponding grooves formed in the upper and lower edges of the front inclined wall of the hopper, and each of said rollers is provided with two corresponding grooves or recesses.

C C are two corresponding endless belts, designed to rest in the grooves of the rollers $b'\ b'$ and to travel over the front and rear surfaces of the front inclined wall of the hopper. These endless belts, which are made of leather, cloth, iron, or other material, are provided with small cleats or plates $b^3\ b^3$, serving as buckets, the same being dissimilarly disposed on each belt—that is, the buckets of one belt are arranged at about the center of the spaces formed between the buckets of the other belt, the purpose and object of which belts will appear farther on. These cleats or plates comprising the buckets are secured to their respective belts by means of rivets passed through right-angular portions thereof, as shown.

C' is a brush, the fibers of which rest against the rear surface of the lower roller $b'$, said brush being secured on an incline by means of two corresponding metallic plates arranged transversely on the bottom of the hopper, as shown in Figs. 3 and 4. At a point near the center of the hopper is a horizontally-disposed stirrer-shaft, D, resting in boxes secured in apertures in the sides of said hopper, and in four or more apertures formed in said shaft are secured stirrer-rods $d\ d$, each rod being at right angles to the adjoining rod. On the projecting end of this stirrer-shaft is rigidly secured a small sprocket-wheel, $d'$, the same being on the side of the hopper with the sprocket-wheel $b^2$ of the lower roller $b'$, as shown.

In the bottom and rear inclined wall of the hopper A is formed a continuous opening or recess, $d^2$, and in the forward end of this opening or recess in the bottom of the hopper are disposed two corresponding rollers, $d^3\ d^3$, the projections or shafts of which are secured in apertured ears or lugs of U-shaped plates $d^4$ $d^4$, to the centers of which are secured rods $d^5$ $d^5$, resting in keeper-plates $d^6$ $d^6$, disposed in recesses formed in the bottom of the hopper, said rods $d^5$ being held outward by means of springs $d^7$ $d^7$, as shown, causing the rollers $d^3$ to nearly touch. This construction permits the rollers $d^3$ to be forced from each other as against the action of their springs.

E is the distributing-wheel, having several fingers or projecting teeth, $e$, secured to or formed integral with the outer surface of the wheel. This distributing-wheel E is keyed to the center of its horizontally-disposed shaft $e'$, which rests in journal-boxes $e''$, secured on the upper surface of rearwardly-projecting parallel arms $e^2$ of the bottom of the hopper. These journal-boxes have rearwardly-extended plates or arms $e^3$, provided with central slots, $e^4$, through which project nutted bolts $e^5$, passed each through an aperture of each arm $e^2$, thus providing means whereby said journal-boxes can, together with the shaft $e'$ and its wheel E, be adjusted at the desired point, for the purpose to be explained. The projecting end of the shaft $e'$ is also provided with a small sprocket-wheel, $e^6$, rigidly secured thereon, the same being on the same side of the hopper as those previously referred to.

F F are two corresponding regulating-plates, designed to be disposed one on each side of the wheel E, as shown, said plates being connected together at their outer rear ends and at a point within the hopper by means of two bent or approximately inverted-U-shaped rods, $f$ $f'$, the same being so secured to said plates as not to interfere with the movement of the wheel E between said plates. The edges of these plates are flanged and project inward toward each other, leaving a space between the same sufficient to permit the passage of the fingers or teeth of the wheel E.

The upper curved portion of the approximately inverted-V-shaped plate $f$ is thickened, as shown, and in the center thereof is formed an aperture through which is passed a screw-bolt, $f''$, provided on its outer rear end with a thumb-head, $f^2$, and on said screw-bolt is passed an ordinary nut, $f^3$, bearing against the front surface of said curved portion of the V-shaped rod $f$. This screw-bolt $f''$ extends through the upper portion of the opening or recess in the rear inclined wall of the hopper, and works in a threaded aperture in a cross-plate, $f^4$, secured to the inner surface of said rear wall of the hopper, as shown. The lower horizontal edges of these corresponding plates F F have right-angular projecting flanges $f^5$ $f^5$ connected at their forward ends and designed to slide on the upper surface of the bottom of the hopper and to protrude over a portion of the rollers $d\,d$, said flanged portions being retained in position by means of plates $f^6$ $f^6$, secured to the bottom of the hopper and having bent overhanging opposite edges, between which and the bottom of the hopper said flanged portions of the plates F are designed to move.

G is a central partition-board, designed to be secured between parallel projecting plates $g\,g$, attached to the inner surfaces of the front and rear walls of the hopper. This partition-board is provided with a central vertical opening or recess, $g'$, to permit of passing the same down over the stirrer-shaft D, said shaft being designed to project through the upper end of said opening or recess $g'$. This partition-board G is provided with a long narrow hinged door, $g''$, designed to be closed over the vertical opening or recess $g'$ after said board is passed down over the stirrer-shaft D, said door being retained closed by means of a pivoted latch secured to said board at one side of the opening or recess. To the upper edge of this partition-board is secured a staple, $g^2$, designed to project through an aperture of the lid or cover of the chute or chamber B, and the same is thus held by means of a hook, $g^3$, also attached to the upper edge of said partition-board and designed to project through said staple, as shown.

The construction of my invention having now been fully outlined, I will proceed to describe the different uses to which the same is applicable.

When it is desired to plant or distribute such grain as corn, wheat, oats, peas, and the like in double or single rows, or two parallel rows, each of different grain, the central partition, G, is secured in position, as above detailed, and the door thereof being firmly closed, the desired grain is placed in the two compartments or chambers of the hopper, and the endless sprocket-chain, passed around the sprocket-wheel $a'$ on the axle of the front supporting-wheel, $a$, is passed around the sprocket-wheel $b^2$ on the axle of the lower roller $b'$. Thus arranged, when the planter is moved forward and motion transmitted from the front wheel, $a$, through the sprocket-chain to the roller $b'$, the two endless belts C C will be caused to revolve with the rollers $b'\,b'$, the buckets thereof catching the desired quantity of grain and conveying the same up to the chute or chamber B, through which it will fall onto the ground or earth. It will thus be seen that two rows are planted simultaneously, and they can be of the same grain or each row of different grain, according to the grain placed in the hopper. By means of the long door $g''$ of the partition-board the grain of one compartment cannot possibly intermingle with that of the other.

When it is desired to employ my invention for planting cotton-seed, I remove the central partition, G, and tranfer the endless sprocket-chain from the wheel $b^2$ and place the same, or one slightly longer, around the sprocket-wheels $d'$ and $e^6$ on the stirrer-shaft D and shaft $e'$, respectively. Prior to starting the planting operation the journal-boxes $e''$ of the shaft $e'$ are adjusted as may be desired, and by working the screw-bolt $f''$, by means of its thumb-head, the corresponding plates F F can be moved in or out, according to the amount of cotton-seed it is desired each finger or tooth of the wheel E shall carry out between the spring-held rollers $d^3$, between which each of said fingers or teeth is designed to pass, the said plate F regulating the extent to which the fingers or teeth of the wheel F are to project beyond the same into the hopper. When the planter is started, motion is transmitted through the endless sprocket-chain to the stirrer-shaft D and the shaft $e'$ of the distributing-wheel E, causing the latter in its revolution to carry the desired amount of cotton-seed out between the spring-held rollers $d^3$, which upon the passage of a finger or tooth immediately return to their former normal position by reason of the springs bearing thereagainst.

From what has been said it will be seen that my invention comprises simple and efficient means for regulating the supply of cotton-seed from the hopper, and that the same can be accomplished in either one of two ways, or by employing both means—namely, the adjustable journal-boxes and the corresponding feed-regulating plates, operated by their screw $f''$.

With reference to the spring-held rollers $d^3$, the construction above described is after my preferred form; but I do not limit myself to the employment thereof, and in lieu of such rollers, if desired, a bar (see Fig. 9) having two spring-arms, $h\,h$, provided with thickened curved portions $h'\,h'$, can be secured in the bottom of the hopper in such manner as to cause said curved portions $h'$ to serve the same purpose as the rollers $d^3$, the fingers of the distributing-wheel being designed to likewise strike between the curved portions of said arms.

I claim as my invention—

1. The combination, with the hopper having its bottom provided with rearwardly-projecting parallel arms, of the distributing-wheel having fingers or teeth, and the adjustable journal-boxes having slotted portions through which nutted bolts are passed, substantially as shown and described.

2. The combination, with the hopper having its bottom and rear wall provided with an opening or recess, of the spring-held rollers disposed in the said opening or recess of the bottom of the hopper, the V-shaped plates having their rods and springs disposed in keeper-plates, and the distributing-wheel having fingers or teeth designed to pass between said rollers, substantially as shown and described.

3. The combination, with the hopper and the distributing-wheel, of the corresponding plates having approximately inverted-U-shaped connecting-rods, and the nutted bolt working in an aperture of one of said rods for adjusting said plates with relation to the teeth of said distributing-wheel, substantially as shown and described, and for the purpose stated.

4. The combination, with the hopper having the opening or recess, of the spring-held rollers, the adjusting-plates having right-angular lower portions, the overhanging guide-plates, and the adjustable distributing-wheel having fingers or teeth designed to pass between said rollers, substantially as shown and described.

5. The combination, with the hopper, of the distributing-wheel having fingers or teeth, the adjustable journal-boxes supporting the shaft of said wheel, the corresponding plates disposed on either side of said wheel and projecting through an opening in the rear wall of said hopper, the U-shaped connecting-rods, and the screw-bolt working in an aperture in one of said rods and an aperture in said hopper for operating said plates, substantially as shown and described.

In testimony whereof I affix my signature in presence of two witnesses.

EUSTIS P. M. ROBINSON.

Witnesses:
H. R. RUSCH,
ANDREW CRESENS.